Patented Oct. 10, 1944

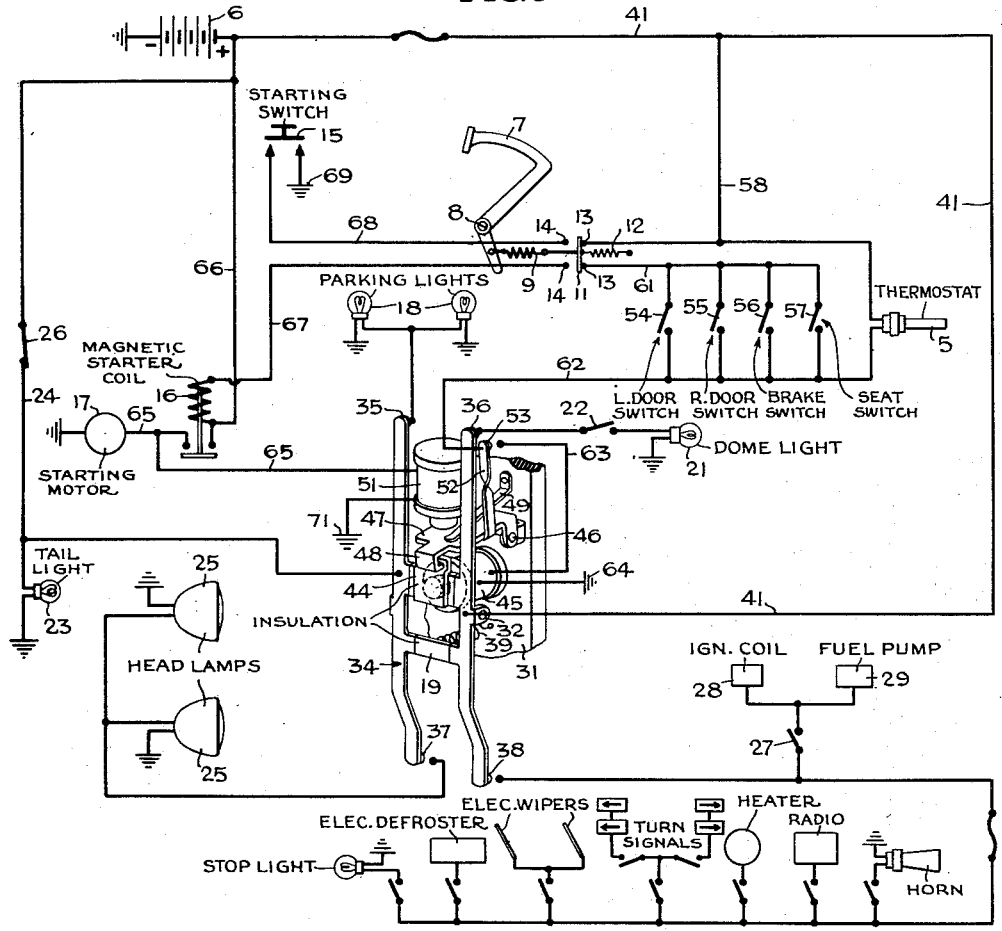
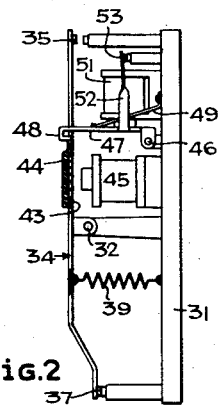
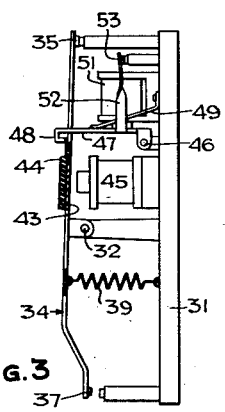
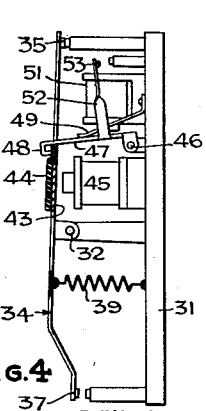

2,360,227

UNITED STATES PATENT OFFICE 2,360,227

SAFETY DEVICE FOR MOTOR VEHICLES

William B. Hemphill, Lansdowne, Pa.

Application December 15, 1942, Serial No. 469,107

6 Claims. (Cl. 180—82)

This invention relates to safety devices for motor vehicles. While it is applicable generally to self-propelled vehicles including pleasure cars, it is intended primarily for use on trucks and will be described as applied to a milk delivery truck, which is operated largely at night, the purpose being to develop the utility of the device in controlling light circuits.

The device offers a simple accessory which can be applied to existing trucks and will accomplish a number of useful results. It will prevent operation of the truck at high speed over rough roads. It will prevent the driver from operating the truck with any door open or indeed with any important part in an improper position. It includes automatic means rendered active by the operator's leaving the driver's seat, and when active serving to establish "standing" conditions. "Standing" conditions imply for example that the motor is stopped, the headlights are dimmed or out, the parking lights are lighted, the interior dome light is lighted and certain auxiliary circuits are deenergized. The requirements vary with the type of service. It may be explained at this point that starting of the motor re-establishes "running" conditions. Hence specifically it turns on the bright headlights, turns out parking lights and interior dome light, and re-energizes the auxiliary circuits.

However, starting of the motor requires special manipulation, conveniently, depression of the clutch pedal, as a condition precedent to completion of the starting motor circuit. The device may also include means for automatically stopping the motor if it becomes overheated.

The heart of the mechanism is a relay including a protective switch mechanism, the relay having two positions, in one of which it establishes running conditions and in the other of which it establishes standing conditions.

There is applied to the clutch pedal a so-called clutch switch which upon full depression of the clutch, conditions the starting circuit to operate and upon a slight depression of the clutch, renders the door or other similar controls inoperative. The purpose of the latter arrangement is to permit the operator to open a door or doors provided he depresses the clutch pedal or provided he is "slipping" the clutch as is customary during backing. This permits the driver to open a door to admit a helper or to look to the rear while backing. Some or all of the various controls can be used within the scope of the invention. The purpose is to illustrate several possible controls to indicate how any or all of them may be incorporated.

A practical embodiment of the invention which has gone into commercial use is illustrated in the accompanying drawing, in which:

Fig. 1 is a diagrammatic view of the complete equipment.

Fig. 2 is a side elevation of the relay in position to establish running conditions.

Fig. 3 is a similar view showing an intermediate position.

Fig. 4 is a similar view showing the relay latched in position to establish standing conditions.

Before describing the relay and its controlling switches certain related apparatus will be outlined.

A thermostatic switch 5 is applied to the engine and arranged to close if the engine becomes over-heated. The battery 6 is the ordinary starting and lighting battery customarily used on electrically equipped motor vehicles. It may be charged in any known way.

The clutch pedal 7 is fulcrumed at 8 and upon depression disengages the clutch as is usual. Connected to the clutch by a spring connection 9 is a contactor 11 which is biased to the right as viewed in Fig. 1 by a tension spring 12 weaker than the spring 9. When the clutch is fully engaged the contactor 11 bridges contacts 13. When the clutch is fully disengaged, the contactor 11 bridges contacts 14. In slipping positions it engages neither set of contacts. The mechanism is diagrammed as a single switch but since the contacts 13 are interposed in the control circuit whereas the contacts 14 are interposed in a portion of the wholly independent starting circuit, the switch function could be carried out by separate switches closing selectively under the conditions stated. No novelty is claimed for the specific switch structure used at this point, but the functions are believed to be novel.

The starting switch 15 could desirably be a push button switch on the dash. Any normally open switch may be used. The magnetic switch 16 is controlled by the switch 15 and acts to complete the starting circuit through the starting motor 17. The parts 15, 16 and 17 are connected as usual except that the circuit from switch 15 to the winding of relay switch 16 is controlled by the contactor 11 and contacts 14.

The light equipment of the truck comprises parking lights 18; dome light 21, with controlling switch 22; tail light 23; and headlights 25.

All lights except the dome light may be turned off by light switch 26. There is also an independent ignition switch 27. The ignition switch 27 controls the flow of current to the ignition coil 28 and the fuel pump 29 which typify apparatus normally controlled by an ignition switch.

The accessory apparatus, which need not be operable while the truck is standing, is indicated by legends and comprises any or all of the following: horn, radio, heater, turn signals, windshield wipers, defroster and stop light. These are typical of apparatus which is or may be needed while the vehicle is moving, and which should be shut down and protected against tampering when the vehicle stands unattended.

The heart of the automatic control is the relay illustrated in perspective in Fig. 1 and in section in the remaining figures. There is an insulated base 31 on which is pivoted at 32 near its mid-length a switch element 34 which has four resilient contact fingers whose form is best shown in the perspective view of Fig. 1. The switch element or lever 34 has two resilient arms connected by an insulating bridge piece 19 and an insulating bridge piece 44, which also serves as a latch keeper. The left arm is connected with the positive terminal of battery 6 by wire 24 in which is interposed light switch 26. The right arm is connected with the same positive terminal by wire 41.

The left arm has at its upper end a contactor 35 which controls the parking lights 18 and at its lower end a contactor 37 which controls the head lights 25. The right arm has at its upper end a contactor 36 which controls the dome light and at its lower end a contactor 38 which controls the connection to the ignition switch 27 and to the accessory apparatus above mentioned. The contactor 37 may control, in addition to the headlights, any other lights on the vehicle which should be lighted when it is in motion, for example, clearance lights, identification lights and the like. The headlights illustrated are typical.

The contactors 35 to 38 coact with fixed contacts mounted on the base 31 and the lever 34 is biased by a tension spring 39 in a counter-clockwise direction. Above the pivot 32 the insulating bridge 44 carries an armature 43 and adjacent this armature the bridge is formed to serve as a latch keeper. The armature 43 is opposite the pole of an electromagnet 45 which is the main magnet of the relay. Pivoted to the base 31 at 46 is an armature 47 which has a latch nose 48 so formed that when the latch is disengaged and the lever 34 swung counter-clockwise as shown in Fig. 2, the latch is held in its disengaged position against the urge of the leaf spring 49 which biases the latch armature in the opposite direction. When the lever 34 is swung clockwise by energization of the winding 45, the arms carrying contacts 35 and 36 are slightly flexed and thus held under good contacting stress by the latch 48 when it engages, as indicated in Fig. 4.

The latch shifts in a releasing direction against the spring 49 upon the energization of the latch magnet 51. The armature 47 carries a light resilient contactor finger 52 which carries at its outer end a contactor 53. This coacts with the fixed contact mounted on the base 31. When the latch is disengaged and the lever 34 is in the running position of Fig. 2, the latch nose holds the armature 47 in such position that contact is maintained at 53. The parts are so arranged that this contact is also maintained as the lever 34 swings clockwise, (see Fig. 3) but is interrupted upon final engagement of the latch 48 (see Fig. 4).

The contact 53 controls the circuit through winding 45 and protects this winding against damage by sustained flow of current. The winding 51 does not require similar protection because it is energized only by holding the starting switch closed.

Connected to be operated by that door of the vehicle which is next the driver is a switch 54. This switch is so arranged that it closes except when the door is completely closed, i. e. it is opened by the final closing movement of the door.

There are three switches 55, 56 and 57 which are functionally similar to the switch 54. There might be any number of such switches connected in parallel so that the closure of any one of them, as a result of an abnormal position of some part of the truck, could operate the relay as hereinafter more fully explained. The switch 55, for example, might be connected to the right hand door of the truck or to the tail gate, the mechanical connection being such that final closure of the door or tail gate opens the switch. The switch 56 might, for example, be connected to the hand brake in such a way that the switch will close except in the fully released position of the brake. 57 is the so-called seat switch. This switch is so related mechanically to the driver's seat that if the driver leaves the seat, the switch will close. Thus the switch will perform its intended function if the driver leaves the cab or if he merely jounces upon the seat as an incident to unreasonably rough riding. All the switches 54, 55, 56, 57 are controlled by the contactor 11 and contacts 13. The thermostatic switch 5 is connected in parallel with the switches just mentioned, but is not controlled by contactor 11. If it is desired, certain of the switches such as 57 need not be controlled by contactor 11 but could be connected as is the thermostatic switch 5.

The connections are diagrammed as follows:

A wire 58 is connected with wire 41 and leads to one contact 13 of the clutch switch. The other contact 13 is connected to one terminal of switches 54 to 57 by wire 61. The wire 58 is directly connected to one terminal of thermostatic switch 5. The other terminals of switches 54, 55, 56, 57 and 5 are connected by wire 62 to contactor 53.

The contact with which contactor 53 coacts is connected by wire 63 with one terminal of winding 45, whose other terminal is grounded at 64.

Under running conditions the relay is in the position of Fig. 2 in which position the parking lights and the dome light are out, the bright headlights are on and the ignition circuit is energized (assuming of course that the ignition switch 27 is closed). If the driver opens the left hand door, the switch 54 will close, and unless at the same time he partly depresses the clutch pedal 7, the relay will shift to position of Fig. 4 and latch there, establishing standing conditions. Thus if the driver disengages, or slips his clutch as he would do in backing, he may open the left hand door for the purpose of looking backward.

Except as just specified, the opening of any door will energize magnet 45 and establish standing conditions. Application of the hand brake or leaving the driver's seat will each energize magnet 45 and thus establish standing conditions, unless the clutch be depressed concurrently. Overheating of the motor to close switch 5 will, of course, energize magnet 45 regardless of the position of the clutch or of the other controls.

Restoration of running conditions is effected by proper use of the starter. The starting motor 17 is fed through line 65 and the line 66 which leads from battery 6 under the control of magnet switch 16. The winding of magnet switch 16 is interposed between wire 66 and a wire 67 which leads to one contact 14 of the clutch switch. The other contact 14 is connected by wire 68 to one terminal of switch 15. The other terminal of switch 15 is grounded at 69. A branch of wire 65 leads to one terminal of winding 51, whose other terminal is grounded at 71.

To summarize, the driver can operate the car only with the doors properly closed and the proper lights turned on. He cannot drive with the dome light on. This prevents the practice of driving while reading route lists. If the driver leaves the seat or opens any door or applies the hand brake without depressing the clutch pedal, standing conditions are immediately established. Before he can re-establish running conditions, he must fully depress the clutch and operate the starting button. If he does this, and if the faulty condition has been rectified, that is, if all doors are closed, etc. he can start the engine, but if there is any abnormal condition, the winding 45 will be energized and the relay cannot shift from the position of Fig. 4 to the position of Fig. 2 notwithstanding the retraction of the latch 48. Hence the controls are completely automatic and impose safe conditions.

It will be observed that if the vehicle is parked with the driver seat occupied, and the doors closed, the engine can be stopped by opening the switch 27 without causing the relay to shift to the position of Fig. 4. This is useful in pleasure cars because it would permit the radio and heater to be operated while the car is parked.

While particular arrangements have been described in considerable detail, an effort has been made to explain the general applicability of the invention and the possibility of making various specific installations within the broad scope of the inventive concept.

What is claimed is:

1. In a safety system, the combination of a motor vehicle having an electric ignition circuit, an engine starter circuit, a running light circuit, a standing light circuit and at least one safety component whose position is critical to the safe operation of the vehicle; a source of electric current; a relay switch adapted to assume a position in which it serves to interrupt the standing light circuit and alternatively a position in which it serves to interrupt the ignition circuit and the running light circuit; switch means controlling energization of the starter circuit connections whereby energization of the engine starter circuit causes the relay switch to shift to its first named position; and switch means operable to cause said relay to shift to its second named position, said last named switch means being connected to be so operated by motion of said safety component to an unsafe position.

2. In a safety system, the combination of a motor vehicle having a standing circuit and a running circuit; a source of current for supplying said circuits; an electric relay switch adapted to close said circuits selectively and including means biasing said relay to a position in which the running circuit is closed and electromotive means for shifting the relay against said bias; means operable by the driver in the act of leaving the vehicle and serving to energize said electromotive means and thus shift the relay to the position in which the standing circuit is closed; a latch for retaining said relay in the last named position; and a switch actuated by said latch and serving upon engagement of the latch to deenergize said electromotive means.

3. In a safety system, the combination of a motor vehicle having a standing circuit and a running circuit; a source of current for supplying said circuits; an electric relay switch adapted to close said circuits selectively and including means biasing said relay to a position in which the running circuit is closed and electromotive means for shifting the relay against said bias; means operable by the driver in the act of leaving the vehicle and serving to energize said electromotive means and thus shift the relay to the position in which the standing circuit is closed; a latch for retaining said relay in the last named position; a switch actuated by said latch and serving upon engagement of the latch to deenergize said electromotive means; an engine starter circuit; and electric means rendered active upon energization of said starter circuit and serving to disengage said latch.

4. The combination of a motor vehicle having a source of electric current, a starting circuit, an ignition circuit, lighting circuits respectively appropriate to running and standing conditions, and components whose position is critical to the safe operation of the vehicle; a selector switch having a running position in which it interrupts the standing lighting circuits, and a standing position in which it interrupts the ignition circuit and the running lighting circuits; means biasing the selector switch to running position; an electromagnet which when energized shifts the selector switch to standing position; a latch for retaining the selector switch in the last named position; a plurality of safety switches arranged to be closed by respective components when in unsafe positions, said safety switches being connected in parallel in a safety control circuit from the source through said electromagnet; a switch controlled by said latch and serving when the latch is engaged to interrupt said safety control circuit; and an electromagnet interposed in said starting circuit and serving when energized to disengage said latch.

5. The combination defined in claim 4 in which the vehicle has a clutch, and one of the safety switches is a door switch arranged to be closed by the opening of a door, and a clutch-operated switch is connected in series with said door switch and is arranged to be closed only when the clutch is fully engaged.

6. The combination defined in claim 4 in which the vehicle has a clutch, and one of the safety switches is a door switch arranged to be closed by the opening of a door, and clutch operated switching means are interposed, both in the starting circuit and in series with said door switch, the arrangement being such that the safety circuit to the door switch is interrupted unless the clutch is fully engaged, and the starting circuit is interrupted unless the clutch is fully disengaged.

WILLIAM B. HEMPHILL.